United States Patent [19]
Baxter

[11] Patent Number: 5,382,409
[45] Date of Patent: Jan. 17, 1995

[54] APPARATUS FOR USE IN ANALYTICAL INSTRUMENTS

[75] Inventor: James A. Baxter, London, United Kingdom

[73] Assignee: Chromacol Limited, London, United Kingdom

[21] Appl. No.: 159,937

[22] Filed: Dec. 1, 1993

Related U.S. Application Data

[63] Continuation of Ser. No. 837,356, Feb. 14, 1992, abandoned.

[30] Foreign Application Priority Data

Apr. 6, 1991 [GB] United Kingdom ............ 9107258.7
Jul. 24, 1991 [EP] European Pat. Off. ........ 91306737.7

[51] Int. Cl.$^6$ ............................. G01N 35/02; B01L 3/00
[52] U.S. Cl. ................................ 422/102; 422/104; 73/864.91; 220/732
[58] Field of Search ............................. 422/99–100, 422/102, 103, 104, 62–65; 73/864.91; 141/130; D24/224; 220/400, 408, 729, 732, 737

[56] References Cited

U.S. PATENT DOCUMENTS

| | | | |
|---|---|---|---|
| D. 299,954 | 2/1989 | Baxter | D24/224 |
| D. 302,591 | 8/1989 | Baxter | D24/227 |
| D. 304,972 | 12/1989 | Baxter | D24/224 |
| D. 304,973 | 12/1989 | Baxter | D24/224 |
| D. 307,052 | 4/1990 | Baxter | D24/224 |
| D. 307,869 | 5/1990 | Miskinis | D24/224 |
| D. 318,727 | 7/1991 | Spike | D24/224 |
| D. 342,141 | 12/1993 | Baxter | D24/224 |
| 3,918,920 | 11/1975 | Barber | 422/104 |
| 4,021,124 | 5/1977 | Sarstedt | D24/224 X |
| 4,931,257 | 6/1990 | Quenin et al. | 422/104 X |
| 4,974,460 | 12/1990 | Baxter | 422/102 |
| 5,038,958 | 8/1991 | Dreier | D24/224 X |
| 5,116,578 | 5/1992 | Baxter | 422/62 X |

FOREIGN PATENT DOCUMENTS

| | | |
|---|---|---|
| 35779 | 9/1981 | European Pat. Off. . |
| 414644 | 2/1991 | European Pat. Off. . |
| 2395780 | 1/1979 | France . |
| 3832460 | 6/1989 | Germany . |
| 8914300 | 1/1990 | Germany . |

*Primary Examiner*—James C. Housel
*Assistant Examiner*—Jeffrey R. Snay
*Attorney, Agent, or Firm*—Christie, Parker & Hale

[57] ABSTRACT

Apparatus for use in analytical instruments such as autosamplers comprises a tapered vial and a sleeve. The sleeve includes an annular inner frustoconical portion which receives the closed end of the vial to locate it in an operative position of an autosampler. The portion may include a cylindrical extension for precisely defining the axial height of the vial relative to the sleeve, and hence the instrument.

7 Claims, 4 Drawing Sheets

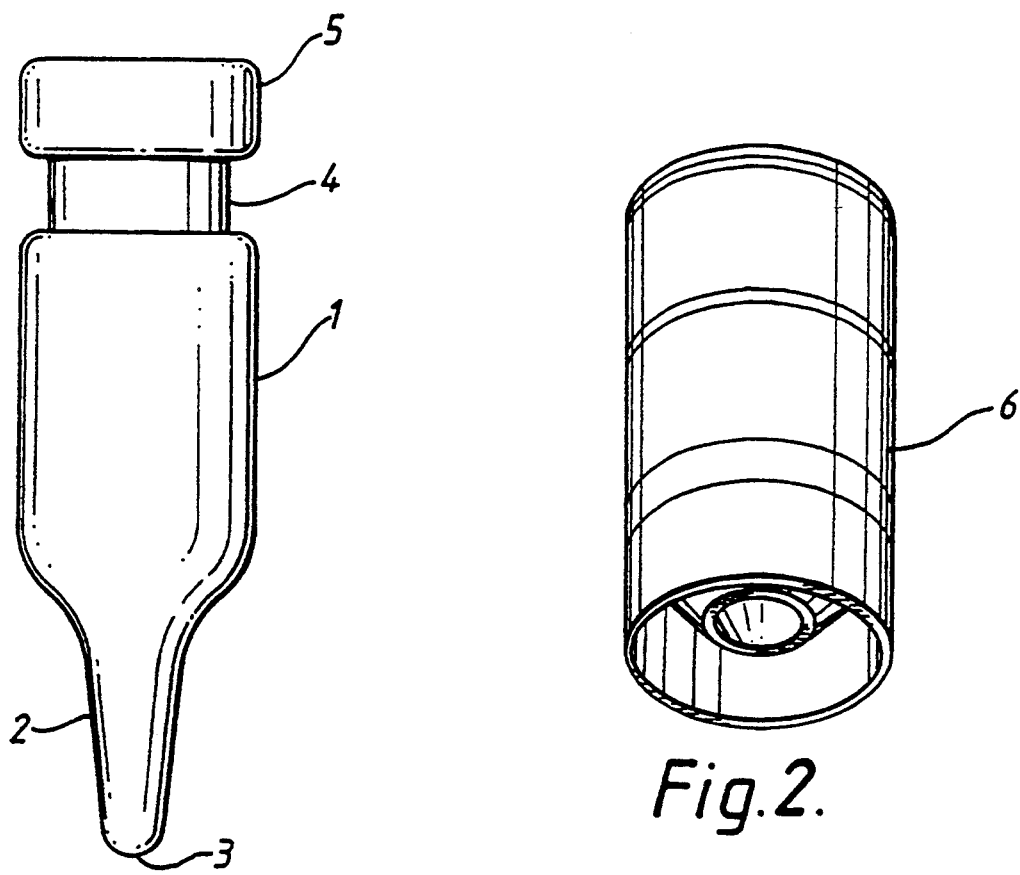
Fig.1.
Fig.2.
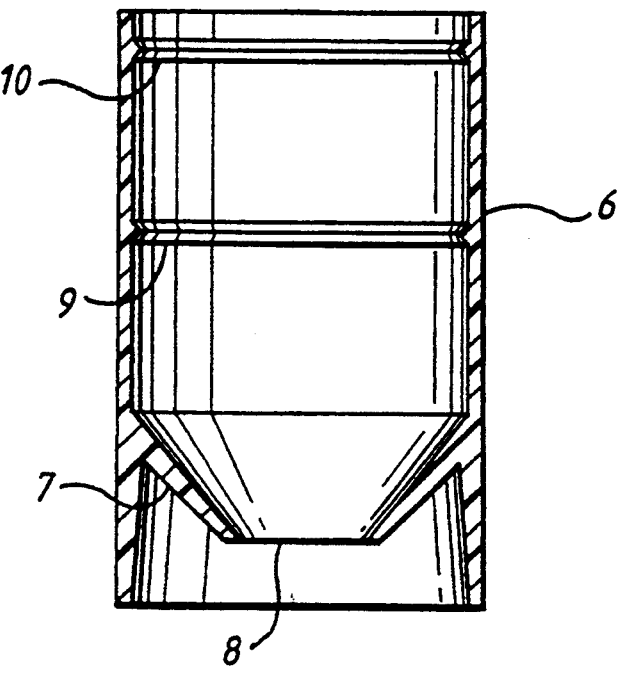
Fig.3.

APPARATUS FOR USE IN ANALYTICAL INSTRUMENTS

Cross-Reference to Related Application

This is a continuation of application Ser. No. 07/837,356, filed Feb. 14, 1992, now abandoned.

BACKGROUND OF THE INVENTION

This invention relates to apparatus for use in analytical instruments and in particular it relates to apparatus for use in instruments such as autosamplers for supporting and retaining substances in the correct disposition with regard to cartridges on such a machine. Autosamplers, such as the Hewlett Packard HP 7673A, generally comprise a carousel having a plurality of apertures into which sample vials can be inserted so that a sampling needle can be lowered into the vial to obtain a sample of a substance held by the vial.

SUMMARY OF THE INVENTION

According to the present invention there is provided apparatus for use in analytical machines, comprising a vial having a closed end, the vial having a taper towards the closed end; and a sleeve adapted to receive the vial and to locate it in an operative position in an analytical machine, the sleeve having a frustoconical portion adapted to accommodate part of the tapering portion of the vial to locate the vial.

According to the invention there is further provided a sleeve adapted to receive a vial having a taper towards its closed end and to locate it in an analytical machine, the sleeve having a frustoconical portion adapted to accommodate part of the tapering portion of a vial to locate the vial.

The sleeve may be cylindrical and the frustoconical portion may be formed by an internal radial conical lip. The cylindrical part may then extend beyond the extent of the lip. The sleeve may include circumferential inwardly directed ribs or protrusions at selected positions along its length for locating tightly a vial.

The vial is preferably necked.

Embodiments of the invention will now be described, by way of example only, with reference to the accompanying drawings.

BRIEF DESCRIPTION OF THE DRAWINGS

FIG. 1 shows a vial;

FIG. 2 shows a perspective view of a sleeve for locating the vial in an autosampler:

FIG. 3 shows a cross section through the longitudinal axis of FIG. 2;

Figure 4:
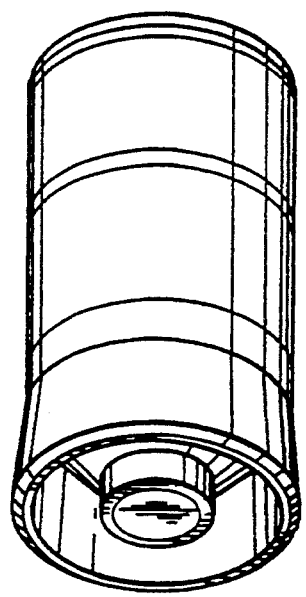
FIG. 4 shows a second sleeve embodying the invention.

It should be noted that the drawings are not necessarily mutually to scale.

DESCRIPTION OF PREFERRED EMBODIMENTS OF THE INVENTION

Referring to FIG. 1, a vial for use in sampling is typically made of a glass such as borosilicate glass. It comprises a generally cylindrical body portion 1. A tapered portion 2 leads from the body portion and terminates in a relatively narrow closed end 3. At the other end of the vial there is a neck 4 and an open collar portion 5. The neck and collar are adapted so that a cap may be crimped on to secure contents inside a vial. Alternatively, other configurations may be used, such as a screwthreaded top, in which case it need not necessarily have a reduced diameter neck. Typically, the vial has a capacity of 0.9 ml and is designed to be suitable for microsampling and other types of work.

A tapered vial as described above allows maximum sample displacement and is admirably suited for microsampling work. However, lateral support is necessary for such a vial, which support may be, but is not always, provided by the wells in autosamplers.

FIG. 2 shows a sleeve. This is typically made to be as low cost as possible and is made of a plastics material, such as polyethylene. Alternatively materials such as PTFE may be used, or any other suitable material. It may be translucent in one embodiment. The sleeve comprises a cylindrical body 6 having an internal diameter suitable for receiving a selected vial lengthwise, and an outside diameter of size chosen to match the apertures in a cartridge or carousel of a desired autosampler. As shown more clearly in FIG. 3, the sleeve includes an internal radial lip or flange 7 which is frustoconical. The cone is truncated and forms an aperture 8 towards the bottom of the sleeve, which aperture is of diameter large enough to enable all or part of the tapered portion of the vial to pass through but not to allow the main body portion of the vial to pass. The aperture serves to prevent the vial from dropping too far down the sleeve, since if it did a robot arm on an autosampler might fail to pick up the vial to transfer it to another position. The cone 7 serves to support and axially position a vial with respect to the sleeve. The angled nature of the walls of the cone also enables a vial inserted at an angle to the longitudinal axis of the sleeve to tilt and slide down into its correct position.

Correct axial positioning of a vial with respect to an autosampling machine can be very important. The conical lip enables easy axial centering. The sleeve also enables the vial to be positioned in a vertical concentric position, which is necessary to ensure correct pick-up by a robot arm.

FIGS. 2 and 3 also show an inner radial rib 9 of small depth. This rib can aid centering of a vial with respect to the sleeve and can help to safely secure a delicate vial but may be omitted in other embodiments. The top of the collar of the sleeve can also optionally have a circumferential indentation 10 as shown which again helps to center and support the vial.

The base of an autosampler well is often not a flat surface, but has a curved or angled surface which may allow the tapered end of a vial to drop down too far with respect to the sleeve, and hence make it difficult to pick up with a robot arm.

Figure 5:
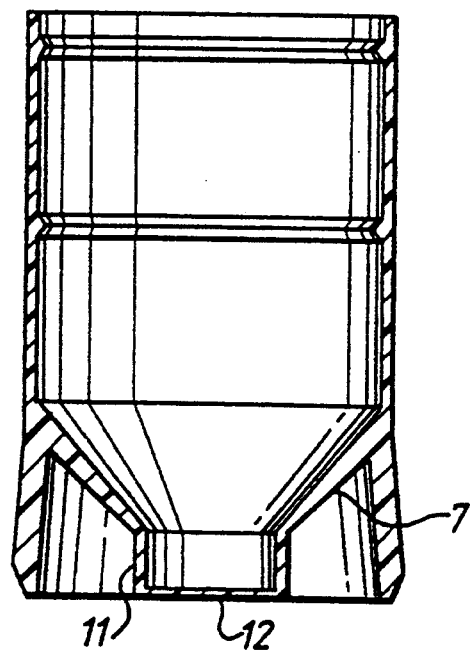
FIG. 5 shows a cross-section through the longitudinal axis of FIG. 4.

FIGS. 4 and 5 show an alternative embodiment of the sleeve intended to prevent this. This sleeve is similar to that of FIGS. 2 and 3 but includes a cylindrical downwardly directed extension 11 on the frustoconical portion 7. The cylinder is closed by a membrane 12 at its distal end, which is general coplanar with the bottom end of outer cylinder 6.

In use, a vial is received in the sleeve such that its end abuts membrane 12, thus positively locating and determining the axial height of the vial. It can be important to determine the height of the vial not only so that the vial can be picked up by a robot arm but also so that the depth of needle insertion into the vial can be accurately determined.

Figure 6:
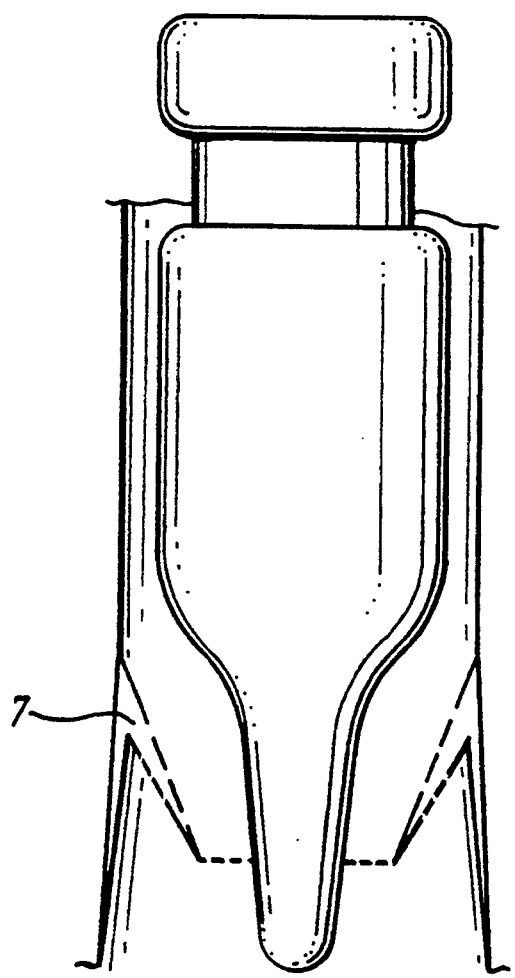
FIG. 6 shows schematically the manner in which the vial is received in the sleeve.

FIG. 6 shows schematically how a vial may be held by a sleeve. This Figure shows how the sleeve body may include a skirt which tapers outwards slightly below the junction with the conical lip portion 7 and has a smooth outwardly tapering curve with a substantially continuous change in slope. The internal diameter of the wells in some autosamplers can vary quite considerably and hence the tapering nature of the skirt can help to secure the sleeve and vial in any one of a range of sizes of wells and can minimize the risk of the sleeve being inadvertently removed from an aperture when a vial or needle is removed. No internal radial ribs are shown in this example.

The sleeve and vial are particularly, but not exclusively, useful when used with autosamplers such as Hewlett Packard HP 7673A and HP 1050 autosamplers, series I and II, in both the storage carousel and the central well above the injection port. The sleeve can be reusable. It can be left permanently in the sample tray holder and the turret above the injection ports of both these autosamplers, with only the sample vial being transported between the two by robot arms. The vials are transferred between their holders in the carousel to a central well which is located below the needle system.

Figure 7:
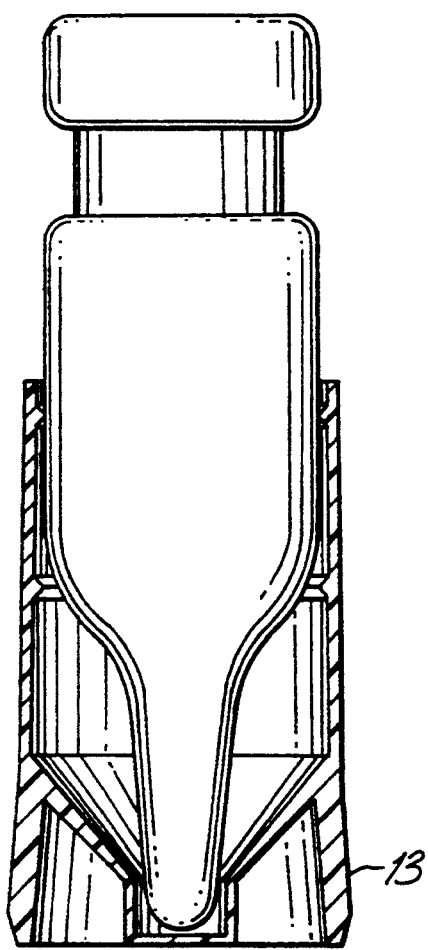
FIG. 7 shows a sleeve of FIG. 5 with a vial as in FIG. 1 disposed therein.
Figure 8:
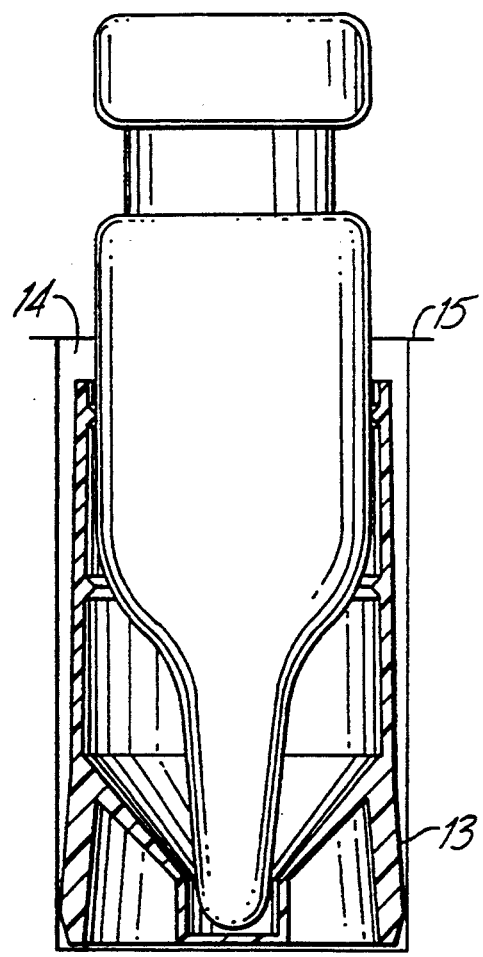
FIG. 8 shows the sleeve and vial of FIG. 7 disposed in a well of an autosampler.

FIG. 7 shows the sleeve of FIG. 5 with the vial of FIG. 1 disposed therein. The skirt 13 of the sleeve tapers outwardly, and explained above. FIG. 8 shows the sleeve and vial inserted in a well 14 of an autosampler 15. The sleeve's skirt 13 has a friction fit in the well, as explained above with reference to FIG. 6.

What is claimed is:

1. A combination comprising an autosampler including a plurality of wells, a sleeve for being located in one of said wells, and a vial for being located within said sleeve, wherein said vial has an open end and a closed end, said vial having a tapering portion towards its closed end; said sleeve comprising a cylindrical body portion, a skirt depending from the cylindrical portion, and an internal annular lip forming a frustoconical portion, the skirt extending level to or beyond the extent of the lip, and the frustoconical portion adapted to accommodate part of the tapering portion of the vial to locate the vial, wherein the skirt is frustoconical and is of wider cross section at its distal portion for frictionally engaging the well and preventing inadvertent removal of the sleeve from the well when an inserted vial is axially removed from the sleeve.

2. The combination of claim 1 wherein the skirt tapers substantially continuously from the cylindrical portion.

3. The combination of claim 1, wherein the skirt tapers from the cylindrical portion with a substantially continuous change in slope.

4. The combination of claim 1, wherein the frustoconical portion has a wider end and a narrower end, and wherein a tubular extension is provided at the narrower end of the frustoconical portion, the extension having a distal end which is closed to define a rest position of the vial inserted in the sleeve.

5. The combination of claim 1, wherein the narrower end of the frustoconical portion has an opening through which the closed end of the vial can protrude.

6. The combination of claim 1, wherein the sleeve has at least two longitudinally spaced annular ribs for locating tightly and centering the vial.

7. The combination of claim 1, wherein the sleeve comprises plastic.

* * * * *